UNITED STATES PATENT OFFICE.

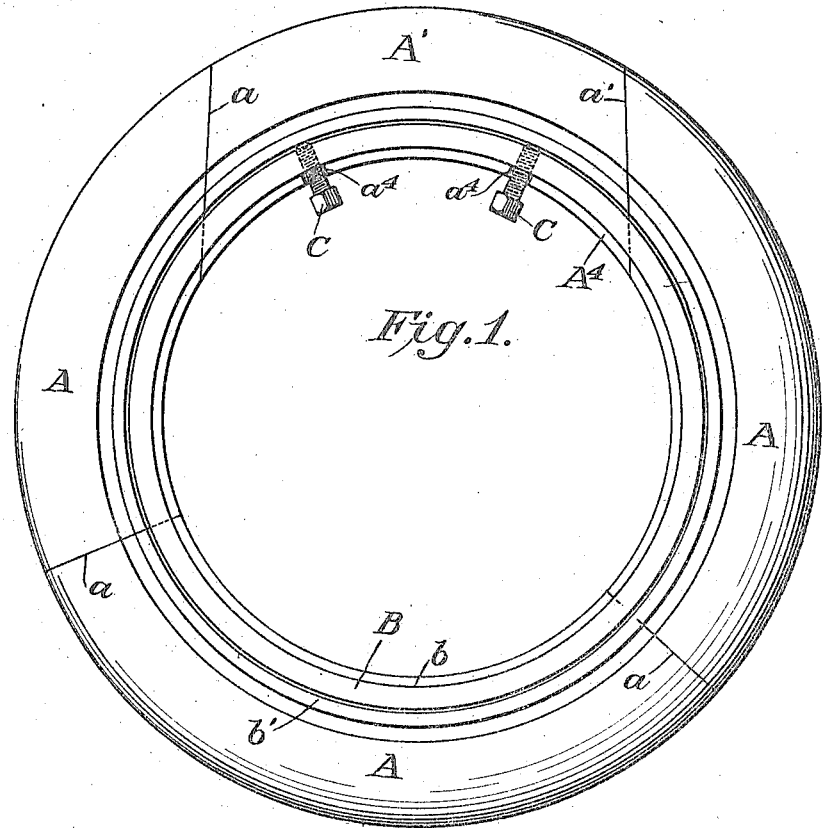
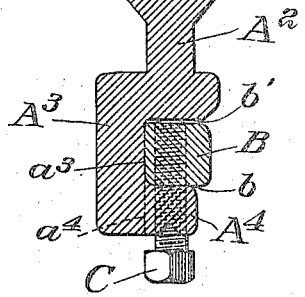

JOHN C. LAURITZEN, OF AKRON, OHIO.

SEPARABLE CORE FOR MAKING PNEUMATIC-TIRE CASINGS.

1,248,681.　　　　　Specification of Letters Patent.　　Patented Dec. 4, 1917.

Application filed May 25, 1916.　Serial No. 99,872.

*To all whom it may concern:*

Be it known that I, JOHN C. LAURITZEN, a citizen of the United States, and resident of Akron, Ohio, have invented certain new and useful Improvements in Separable Cores for Making Pneumatic-Tire Casings, of which the following is a specification.

My present invention relates to improvements in what are known as collapsible or separable cores used for manufacturing the outer shoes or casings of double tube pneumatic tires.

The invention aims to provide a core of extreme simplicity which will have no taper fits requiring accurate machining, which may be easily and quickly assembled, and in which a minimum number of parts are provided requiring manipulation to clamp the assembled parts in tire forming position and in which there are no small parts such as bolts, and nuts which are detachable when the core is separated and liable to become lost or mislaid.

With these and other objects in view, the invention includes the novel features of construction and arrangement and combination of parts hereinafter described and particularly defined by the appended claims.

A core embodying my invention is illustrated in the accompanying drawings, in which, Figure 1 is a side elevation of such a core.

Fig. 2 is a transverse section taken through the tapered or key section.

Referring by reference characters to this drawing, the ring core proper is shown as consisting of a plurality of sections A and A', the core being shown as a four-piece core, though it will be understood that the number of sections may be varied as desired. One of these sections A' is separated from the others by non-radial or outwardly converging lines, indicated at $a'$, thus making this section wedge-shaped and enabling it to be withdrawn inwardly toward the center of the ring core without disturbing the other sections, which are unlocked by the removal of such section A, which constitutes a key piece. After the key-piece or section A' is withdrawn the other sections may be separately withdrawn through the open center of the shoe piece by piece.

The lines of severance between the other sections may be radial, as indicated at $a$.

The body of the core is shaped in cross section to correspond to the interior shape of the tire carcass to be built thereon and has an inwardly extending flange $A^2$, provided with a thickened or enlarged portion at the inner edge thereof, as indicated at $A^3$. At one side this thickened portion is provided with a laterally extending groove or channel $a^3$, the opposing inner and outer walls of which are parallel to each other. Within this channel is placed a locking or retaining ring B, the wall $b$ of which is constructed to fit the inner wall of the groove with an approximately snug fit, while its outer wall $b'$ fits the corresponding outer wall of the channel with a comparatively loose fit.

Means are provided by which, after the sections have been assembled and the ring B placed in the channel, pressure may be exerted tending to force the key piece A' outwardly relative to the retaining ring B and the other sections.

Such means is shown in the drawing as taking the form of one or more screw bolts (preferably two) as indicated at C which are screwed into threaded openings through the ring B and have their inner portions resting in recesses $a^4$ in the inner flange $A^4$ of the thickened portion, which flange forms the inner wall of the channel $a^3$. The outer ends of these screw bolts are adapted to bear or impinge against the outer wall of the channel and when the bolts are tightened or screwed outwardly the wedge or key section A' is forced outwardly and the reaction against the corresponding portion of the ring tends to bind all of the sections firmly together, and hold the ring by friction in the channel. After the tire has been finished upon the core and the core is to be removed therefrom, the loosening of the screw bolts releases the frictional engagement, whereupon it may be readily removed, the heads of the bolts affording convenient means for its removal.

What I claim is:—

1. A separable core comprising a plurality of sections in ring form when assembled and having inwardly extending portions forming an annular flange, said flange having an enlarged inner portion provided with an annular laterally open channel, a ring seated in said channel, and means adjustable relatively to said ring carried by said ring for exerting outward pressure on one of the sections and inward pressure on the corresponding portion of said ring.

2. A separable core comprising a plurality of sections in ring form when assembled and having inwardly extending portions forming an annular flange, said flange having an enlarged inner portion, provided with an annular open channel, a ring seated in said channel and a screw bolt threaded through said ring and engaging the inner wall of the channel in one of the sections.

3. A separable core comprising a plurality of sections in ring form when assembled and having inwardly extending portions forming an annular flange, said flange having an enlarged inner portion provided with a laterally open channel, one of said sections of the core being wedge-shaped, a ring seated in said channel, a pair of bolts threaded through openings in the ring and engaging the outer wall of the channel in the wedge-shaped section, the inner wall of the channel being provided with laterally opening recesses to receive the shanks of said bolts.

4. A core of the character described comprising a plurality of separate sections, having inwardly extending flanges provided with arcuate laterally positioned facial recesses, which, in the assembled condition of the sections provide an annular channel having two side walls, a ring-shaped locking member mounted in said channel, and threaded radially movable means extending between said member and one of the walls of the recess in one of the core sections for shifting the latter outwardly and the former inwardly against the inner wall of said channel.

5. A core of the character described comprising a plurality of separate sections, having inwardly extending flanges provided with arcuate laterally positioned facial recesses, which, in the assembled condition of the sections, provide an annular channel having two side walls, a ring-shaped locking member less in radial width than said channel and positioned therein, and threaded radially movable means extending between one of the radial faces of said member and one of the opposing walls of the recess of one of the core sections for shifting the position of the latter and locking it against movement.

JOHN C. LAURITZEN.